United States Patent
Chinnadurai et al.

(10) Patent No.: US 10,140,679 B2
(45) Date of Patent: Nov. 27, 2018

(54) SMART COMPOSITION OF OUTPUT LAYERS

(71) Applicant: INTEL IP CORPORATION, Santa Clara, CA (US)

(72) Inventors: Srinivasan Chinnadurai, Thanjavur (IN); Binu Rajendran Sheela, Bangalore (IN)

(73) Assignee: Intel IP Corporation, Santa Clara, CA (US)

( * ) Notice: Subject to any disclaimer, the term of this patent is extended or adjusted under 35 U.S.C. 154(b) by 22 days.

(21) Appl. No.: 15/396,498

(22) Filed: Dec. 31, 2016

(65) Prior Publication Data

US 2018/0189922 A1 Jul. 5, 2018

(51) Int. Cl.
| | |
|---|---|
| *G09G 5/00* | (2006.01) |
| *G06T 1/20* | (2006.01) |
| *G09G 5/393* | (2006.01) |
| *G06T 1/60* | (2006.01) |

(52) U.S. Cl.
CPC ............. *G06T 1/20* (2013.01); *G06T 1/60* (2013.01); *G09G 5/393* (2013.01); *G09G 2360/127* (2013.01)

(58) Field of Classification Search
CPC ............. G09G 5/14; G09G 2340/10; G09G 2340/125; G06T 11/60; H04N 5/44504
See application file for complete search history.

(56) References Cited

U.S. PATENT DOCUMENTS

| | | | |
|---|---|---|---|
| 2017/0034059 A1* | 2/2017 | Annamraju | H04L 65/4092 |
| 2017/0116951 A1* | 4/2017 | Wang | G09G 5/001 |

* cited by examiner

*Primary Examiner* — Todd Buttram
(74) *Attorney, Agent, or Firm* — Grossman, Tucker, Perreault & Pfleger, PLLC

(57) ABSTRACT

Device performance and battery life may be increased by prioritizing access to the display controller hardware overlay support such that the layer(s) placing the greatest potential demand (i.e., those layers that are frequently changing and/or large) on the GPU are instead handled in the display controller hardware overlay support. Device performance and battery life may be further increased by identifying those layer(s) that do not change frame-to-frame and excluding those layer(s) from composition.

24 Claims, 7 Drawing Sheets

SMART COMPOSITION OF OUTPUT LAYERS

TECHNICAL FIELD

The present disclosure relates to systems and methods for generating display output layers.

BACKGROUND

In Android™ graphics implementation, individual layers are rendered and composited using OpenGLIES™ composition (OpenGL for Embedded Systems by the Khronos Group, BEAVERTON, Oreg.). OpenGL ES is a subset of the OpenGL graphics rendering application programming interface (API) for rendering 2D and 3D computer graphics typically hardware accelerated using a graphics processing unit (GPU). OpenGLIES is designed for use in embedded systems such as smartphones, tablet computers, video game consoles, and personal digital assistants. OpenGLIES is one of the most widely deployed 3D graphics APIs and therefore represents an attractive broad base for enhancing device performance.

The composited frame is provided to the display controller for display on the device user interface. If the device display controller includes hardware overlay support, then some or all of the layers may be compo sited using the hardware overlay capabilities of the device display controller. If the overlay support included in the device display controller is limited to a particular size or number of frames, then layers are allocated between OpenGLIES composition and the hardware overlay support. The use of OpenGLIES™ increases GPU load and overall device power consumption.

BRIEF DESCRIPTION OF THE DRAWINGS

Features and advantages of various embodiments of the claimed subject matter will become apparent as the following Detailed Description proceeds, and upon reference to the Drawings, wherein like numerals designate like parts, and in which:

Figure 1:
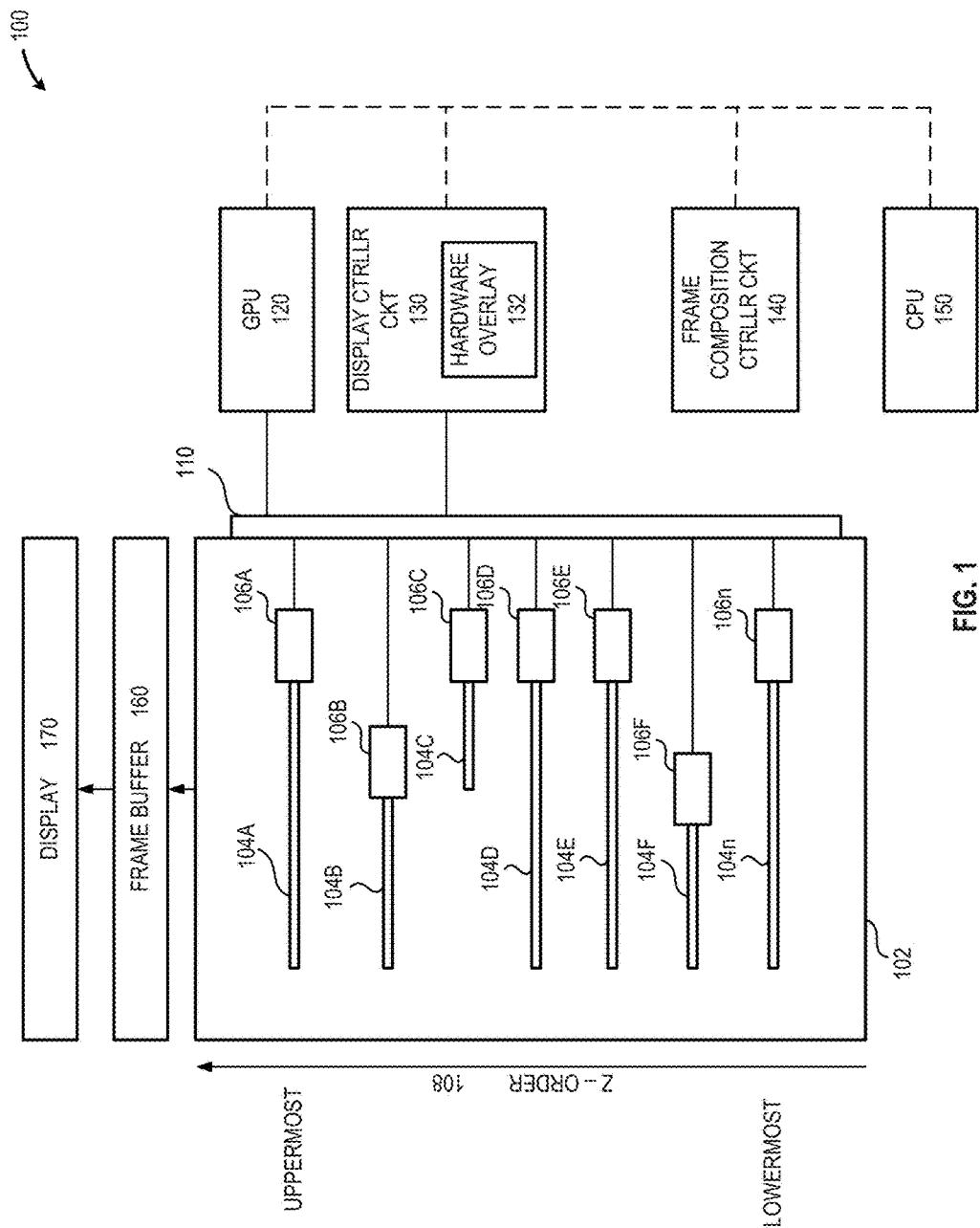
FIG. 1 is a schematic diagram of an illustrative system that includes a display frame that may include any number of composited display frame layers that are rendered and composited using a graphic processing unit, display controller circuit, or combinations thereof, in accordance with at least one embodiment described herein.

Although the following Detailed Description will proceed with reference being made to illustrative embodiments, many alternatives, modifications and variations thereof will be apparent to those skilled in the art.

DETAILED DESCRIPTION

At present, display hardware having enhanced capabilities to handle overlay layers (and thereby offload the GPU) is available, however allocation of layers between the GPU and the display controller hardware overlay support frequently occurs without regard to the actual load a layer places on a graphic processing unit (GPU). For example, some layers may remain unchanged frame-to-frame but may still be rendered using the display controller hardware overlay support—consuming a valuable resource while providing no benefit—an inefficiency in the use of system resources. Similarly, some layers may frequently change and may be rendered using the GPU since the display controller hardware overlay support is consumed by other layers.

Device performance and battery life may be increased by prioritizing access to the display controller hardware overlay support such that the layer(s) placing the greatest potential demand (i.e., those layers that are frequently changing and/or large) on the GPU are instead handled in the display controller hardware overlay support. Device performance and battery life may be further increased by identifying those layer(s) that do not change frame-to-frame and excluding those layer(s) from composition.

First, the most frequently changing layers are assigned to the display controller hardware overlay support. Assigning the most frequently changing layers to the display controller hardware overlay support may be accomplished in a number of steps. First, identify the most frequently changing layer(s) based on changes in the buffer handle over a period of frames (e.g., over a period of "N" frames). Second, confirm the chosen layer size is significant to the overlay—larger layers are preferred over smaller layers due to the increased image processing demands imposed by the larger layers. Third, analyze and identify overlapping and non-overlapping layers within the chosen layer and group layers to ensure the z-order of the frame is maintained.

Further, the image processing load placed on system resources may be reduced by re-using all or a portion of a previously composited layer if the composited layer remains unchanged from frame-to-frame. Such unchanging layers may be identified by tracking the buffer handle of the frames and reusing in the composited frames (without processing via GPU) if the buffer handle remains unchanged frame-to-frame.

A system to selectively compose layers via system hardware is provided. The system may include: a graphical processing unit (GPU); a display controller circuit, including a hardware overlay circuit, communicably coupled to the GPU; and a frame composition controller circuit communicably coupled to the GPU and to the display controller circuit, the frame composition controller circuit to: for each layer included in a plurality of layers that form a display frame, determine a frame-to-frame change rate value that corresponds to a predicted compositional load the respective layer would place on the GPU; identify layer having a frame-to-frame change rate value corresponding to placing the greatest predicted compositional load on the GPU; cause the hardware overlay circuit to compose the layer having the frame-to-frame change rate value indicative of placing the greatest predicted compositional load on the GPU to provide at least one first frame overlay; cause the GPU to compose at least a portion of the remaining layers included in the plurality of layers to provide a second frame overlay; and cause the display controller to composite the first frame overlay and the second frame overlay to provide the display frame.

A method of selectively composing layers via system hardware is provided. The method may include, for each layer included in a plurality of layers that form a display frame, determining, by a frame composition controller circuit, a frame-to-frame change rate value corresponding to a predicted compositional load the respective layer would place on a graphical processing unit (GPU); identifying a layer having a frame-to-frame change rate value corresponding to placing the greatest predicted compositional load on the GPU; causing a hardware overlay circuit coupled to a display controller circuit to compose the layer identified as having the frame-to-frame change rate value corresponding to placing the greatest predicted compositional load on the GPU to provide a first frame overlay; causing the GPU to compose at least a portion of the remaining layers included in the plurality of layers to provide a second frame overlay; and causing the display controller circuitry to composite the first frame overlay and the second frame overlay to provide the display frame.

A system for selectively composing layers via system hardware is provided. The system may include: a means for determining, for each layer included in a plurality of layers that form a display frame, a frame-to-frame change rate value corresponding to a predicted compositional load the respective layer would place on a graphical processing unit (GPU); a means for identifying a layer having a frame-to-frame change rate value corresponding to placing the greatest predicted compositional load on the GPU; a means for causing a hardware overlay circuit coupled to a display controller circuit to compose the layer identified as having the frame-to-frame change rate value corresponding to placing the greatest predicted compositional load on the GPU to provide a first frame overlay; a means for causing the GPU to compose at least a portion of the remaining layers included in the plurality of layers to provide a second frame overlay; and a means for causing the display controller circuitry to composite the first frame overlay and the second frame overlay to provide the display frame.

A non-transitory computer readable medium that includes instructions that when executed by a circuit cause the circuit to provide a frame composition controller circuit is provided. The frame composition controller circuit may: determine, for each layer included in a plurality of layers that form a display frame, a frame-to-frame change rate value corresponding to a predicted compositional load the respective layer would place on a graphical processing unit (GPU); identify a layer having a frame-to-frame change rate value corresponding to placing the greatest predicted compositional load on the GPU; cause a hardware overlay circuit coupled to a display controller circuit to compose the layer identified as having the frame-to-frame change rate value corresponding to placing the greatest predicted compositional load on the GPU to provide a first frame overlay; cause the GPU to compose at least a portion of the remaining layers included in the plurality of layers to provide a second frame overlay; and cause the display controller circuitry to composite the first frame overlay and the second frame overlay to provide the display frame.

An electronic device is provided. The electronic device may include a frame composition controller circuit to: determine, for each layer included in a plurality of layers that form a display frame, a frame-to-frame change rate value corresponding to a predicted compositional load the respective layer would place on a graphical processing unit (GPU); identify a layer having a frame-to-frame change rate value corresponding to placing the greatest predicted compositional load on the GPU; cause a hardware overlay circuit coupled to a display controller circuit to compose the layer identified as having the frame-to-frame change rate value corresponding to placing the greatest predicted compositional load on the GPU to provide a first frame overlay; cause the GPU to compose at least a portion of the remaining layers included in the plurality of layers to provide a second frame overlay; and cause the display controller circuitry to composite the first frame overlay and the second frame overlay to provide the display frame.

As used herein the term "logically associated" and information and/or data referred to as sharing or having a "logical association" or being "logically associated" share a defined, logical, systemwide, bidirectional, relationship, unless otherwise specifically stated. For example, if data in data structure "A" is "logically associated" with data in data structure "B," then the logical association between the data in data structure "A" and the data in data structure "B" means that any mention of the data included in data structure "A" makes available the logically associated data in data structure "B." Similarly, any mention of the data included in data structure "B" makes available the logically associated data in data structure "A." By way of non-limiting example, the links between relational databases provide one example of a "logical association."

As used herein the terms "upper," "lower," "uppermost," "lowermost" should be considered relative and not absolute. Thus, devices, systems, frames, components, or similar physical or logical structures referred to as upper, lower, uppermost, and/or lowermost may change location depending on the physical orientation of the system. For example, a data structure or logical element described as being the "uppermost" should be understood to include the same data structure or logical element positioned as the "lowermost" in the event the system is inverted.

FIG. 1 provides a schematic diagram of an illustrative system 100 that includes a display frame 102 that includes three illustrative display frame layers 104A-104n (collectively "layers 104") that are composed and composited using hardware such as a graphic processing unit 120, a display controller circuit 130, or combinations thereof, in accordance with at least one embodiment described herein. A frame composition controller circuit 140 controls the allocation of layers 104 for OpenGLIES composition via the GPU 120 or hardware composition via the display controller circuit 130.

The frame composition controller circuit 140 identifies static or unchanging layers 104 (i.e., those layers 104 that do not experience a change in content in the current frame from the immediately preceding frame). The frame composition controller circuit 140 may direct the identified static or unchanging layers 104 to the display controller circuit 130 for where they are composited with one or more OpenGLIES layers composed using the GPU 120 and/or one or more layers composed using the hardware overlay circuitry 132 in the display controller circuit 130. The layers 104A-104n are stacked or are otherwise arranged in a z-order 108. The display controller circuit 130 composites the layers 104 to generate a single display frame 102 visible via one or more display devices 170 to the device user.

In operation, the frame composition controller circuit 140 determines a frame-to-frame change rate value for each of the layers 104. The frame-to-frame change rate value is indicative of the prospective load placed on the GPU 120 if the respective frame 104 were composed by the GPU 120 using OpenGLIES. The frame composition controller circuit 140 determines a frame-to-frame change rate value for each respective layer 104 using any method, algorithm, or combination thereof. For example, in one implementation, the frame composition controller circuit 140 may determine the frame-to-frame change rate value based on the size of the respective layer 104 and the percentage of the respective layer 104 that is changing from frame-to-frame.

After identifying the layer 104x (where "x" may represent any layer 104A-104n) having the greatest frame-to-frame change rate value, the frame composition controller circuit 140 determines whether the identified layer 104x represents the uppermost layer 104A in the z-order 108, the lowermost layer 104n in the z-order, or a non-overlapping intermediate display frame layer 104 in the z-order 108. In response to identifying the display frame layer 104x as having the greatest frame-to-frame change rate value, the frame composition controller circuit 140 selectively composes the respective display frame layer 104x using hardware overlay circuitry 132. The remaining layers 104 (i.e., those layers not having the greatest frame-to-frame change rate value) are composed by the GPU 120 using OpenGLIES. The GPU 120 provides the OpenGLIES composed layers 104 to the display controller circuit 130 where the layers 104 are composited with the hardware overlay composed layer 104x to generate the display frame 102. In embodiments, the display frame 102 may be stored or otherwise retained in a frame buffer 160 prior to display using one or more display devices 170.

The above system, discussed in greater detail below, advantageously composes the layer 104x having the greatest frame-to-frame change rate value (and, consequently, a relatively greater potential GPU loading) using the hardware overlay 132, thereby decreasing the load placed on the GPU 120. In turn, the layers 104 placing a lesser load on the GPU 120 are composed using OpenGLIES in the GPU 120, thereby more efficiently allocating system resources, improving rendering speed, and improving overall system responsiveness—particularly for graphics intensive and/or high frame rate applications such as gaming and media consumption.

The display frame 102 is composed of a number of layers 104 composited in a defined z-order 108. In implementations, at least some of the layers 104 are composed by the GPU 120 using OpenGLIES. In implementations, some layers 104 may remain unchanged, or static, from frame-to-frame, these previously composed display frame layers 104 may be communicated directly to the display controller circuit 130 where they are composited with layers composed by the GPU 120 and with at least one layer composed using the hardware overlay 132.

Each display frame layer 104A-104n includes a respective, logically associated, display frame buffer handle 106A-106n (collectively "buffer handle 106") that includes information defining the corresponding display frame layer 104 (location on screen, z-order, size, content data, etc.). The buffer handle 106 provides a convenient data set used by the frame composition controller circuit 140 to determine the frame-to-frame change rate value and therefore indicative of the prospective load the respective layer 104 would place on the GPU 120 if composed using OpenGLIES. The display frame buffer handle 106 also provides the frame composition controller circuit 140 with additional information that enables the frame composition controller circuit 140 to determine whether the respective layer 104x overlays (i.e., overlaps) any other display frame layer 104 in the respective display frame 102 and/or determine whether the respective layer 104x represents the uppermost layer 104A or lowermost layer 104n in the z-order 108. The buffer handle 106 may provide the frame composition controller circuit 140 with data indicative of the relative changes (e.g., changes in size, location, and content) of the layer 104 with which the buffer handle 106 is logically associated. Thus, by examining at least at portion of the content of the buffer handle 106 associated with each layer 104, the frame composition controller circuit 140 is able to beneficially identify those layers 104 presenting the relatively greatest potential GPU loading (e.g., based on size, location, and/or content changes frame-to-frame) and those layers 104 that are unchanged from frame-to-frame.

The bus 110 may include any number and/or combination of systems and/or device capable of providing a unidirectional or bidirectional communication pathway between the GPU 120, the display controller circuit 130 and the display device 170.

The graphic processing unit (GPU) 120 may include any number and/or combination of circuits, systems, and/or devices capable of composing layers 104 that are provided to the display controller circuit 130. In embodiments, the GPU 120 may compose layers 104 using a two-dimensional or three-dimensional application programming interface (API) such as OpenGL or OpenGLIES. In embodiments, the GPU 120 may include one or more stand-alone circuits including electrical components, semiconductor devices, and/or logic elements disposed physically separate from, but communicably coupled to the CPU 150. In embodiments, the GPU 120 may include one or more graphics processors physically integrated partially or completely within the central processing unit (CPU) 150 (e.g., integrated graphics or an integrated graphics processor). In some implementations, the GPU 120 may include one or more graphic processors disposed on a shared silicon substrate (e.g., a system-on-a-chip or SoC).

The GPU 120 may compose any number of display frame layers 104. In some implementations, the GPU 120 may compose any number of overlaying or non-overlaying adjacent display frame layers 140. In some implementations, the GPU 120 may compose some or all of the display frame layers 104 forming a display frame 102. In other implementations, the GPU 120 may compose only a portion of the layers 104 forming the display frame 102. In implementations where the GPU provides the display frame 102, the GPU 120 may use OpenGLIES (OpenGL for Embedded System, Khronos Group, Inc. BEAVERTON, Oreg.) to compose the layers 104. However, placing such OpenGLIES composition load on the GPU 120 detrimentally decreases system responsiveness and increases the power demand placed on the system power supply or battery. In embodiments where the display controller circuit 130 includes hardware overlay 132, the frame composition controller circuit 140 may instead communicate the layer 104x identified as having the greatest frame-to-frame change rate value to the hardware overlay 132.

The display controller circuit 130 includes any number and/or combination of devices, systems, and/or components capable of producing a display frame 102 by compositing a number of layers 104. The display controller circuit 130 provides hardware capable of compositing any number of layers 104 to form a two-dimensional (2D) or three-dimensional (3D) display frame 102. In at least some implementations, the display controller circuit 130 may include hardware overlay circuitry 132 capable of composing one or more layers 104 external to the GPU 120. In some implementations, the display controller circuit 130 may include circuitry or circuits containing any number, combination, and/or configuration of electrical components, semiconductor devices, and/or logic elements that are incorporated, in whole or in part, into the GPU 120. In some implementations, the display controller circuit 130 may include circuitry or circuits containing any number, combination, and/or configuration of electrical components, semiconductor devices, and/or logic elements that are incorporated, in whole or in part, into an integrated circuit or similar device physically separate from and communicably coupled to the GPU 120 and/or the CPU 150.

The display controller circuit 130 includes a hardware overlay circuit 132 that may be used to compose a fixed number of layers 104. The hardware overlay circuit 132 may compose layers more efficiently (i.e., in less clock cycles or at a higher frequency) than a software based composition solution such as OpenGLIES executed by the GPU 120. In some implementations, overall system efficiency and responsiveness are increased and/or improved by allocating to the hardware overlay circuitry 132 those layer(s) 104 having the most intensive composition tasks (e.g., layer(s) having the greatest frame-to-frame change rate value) and allowing the GPU 120 to compose less computationally intensive layers 104 using OpenGLIES.

The frame composition controller circuit 140 includes any number and/or combination of circuits or circuitry including electrical components, semiconductor devices, and/or logic elements capable of determining a frame-to-frame change rate value associated with each of the display frame layers 104. In at least some implementations, the frame-to-frame change rate value may provide an indication of the relative composition load the respective layer 104 may place on a GPU 120 if composed using OpenGLIES by the GPU 120. In some implementations, the CPU 150 may include some or all of the frame composition controller circuit 140. In some implementations, the CPU 150 may include one or more circuits that upon executing one or more instruction sets transform the one or more circuits to the frame composition controller circuit 140. In implementations, the frame composition controller circuit 140 allocates otherwise apportions the display frame layers 104 to the GPU 120 and the display controller circuit 130. In some implementations, the frame composition controller circuit 140 causes the selective composition of the layer 104 having the greatest frame-to-frame change rate value using the hardware overlay 132 and the selective composition of some or all of the remaining layers 104 using OpenGLIES in the GPU 120. In some implementations, the frame composition controller circuit 140 may identify those layers 104 that are unchanged from frame-to-frame and which remain in the same location within the z-order 108 frame-to-frame and may simply composite the static layers 104 without composition by either the GPU 120 or the hardware overlay 132.

In some implementations, the frame composition controller circuit 140 may determine the prospective GPU loading of a display frame layer 104 based on information and/or data included in the logically associated display frame buffer handle 106 indicative of one or more of: frame-to-frame changes in the size of the respective layer 104, frame-to-frame content changes in the respective layer 104, frame-to-frame color changes in the respective layer 104, and frame-to-frame composition changes in the respective layer 104.

The CPU 150 includes any number and/or combination of processors, microprocessors, controllers, digital signal processors, application specific integrated circuit (ASIC), systems-on-a-chip (SoC), or similar. In some implementations, the CPU 150 may include any device, system, or combination thereof capable of providing at least the frame composition controller circuit 140. Non-limiting examples of such CPUs include: Qualcomm Snapdragon series CPUs (Qualcomm, Inc., SAN DIEGO, Calif.); Nvidia Tegra series CPUs (Nvidia Corp., SANTA CLARA, Calif.); Intel Atom, Core i3, Core i5, Core i7, Core M, Xeon series CPUs (Intel, Inc., SANTA CLARA, Calif.); Samsung Exynos series CPUs; and similar. The CPU 150 executes an operating system that provides basic device functionality. In embodiments, the operating system may include, but is not limited to, an Android® operating system, such as Android 7.0 (codename: Nougat) by Google, Inc. (MOUNTAIN VIEW, Calif.).

The display frame buffer 160 includes any number and/or combination of storage devices and/or systems capable of storing image (e.g., frame) data for subsequent communication to one or more display devices 170. In some implementations, the display frame buffer 160 may include dual ported dynamic random access memory (DRAM). In such implementations, the display frame buffer 160 may include two sets of data output pins (i.e., two ports) that may be used simultaneously. The first port is communicably coupled to at least one of the GPU 120 and/or display controller circuit 130 to receive image data generated by the system 100. The second port is communicably coupled to the display device 170. In some implementations, the GPU 120 may include all or a portion of the display frame buffer 160. In some implementations, a portion of system random access memory (RAM) may provide at least a portion of the display frame buffer 160.

The display device 170 may include any type, number, and/or combination of image display device capable of providing a human perceptible visual output using, at least in part, the information and/or data stored or otherwise retained in the display frame buffer 160. The display device 170 may include a touchscreen display capable of accepting input as well as providing output. In embodiments, the display device 170 includes a backlit display device, such as a liquid crystal display (LCD). In embodiments, the display device 170 includes a self-illuminated display device such as a light emitting diode (LED) display, a polymer LED display, or an organic LED display.

Figure 2:
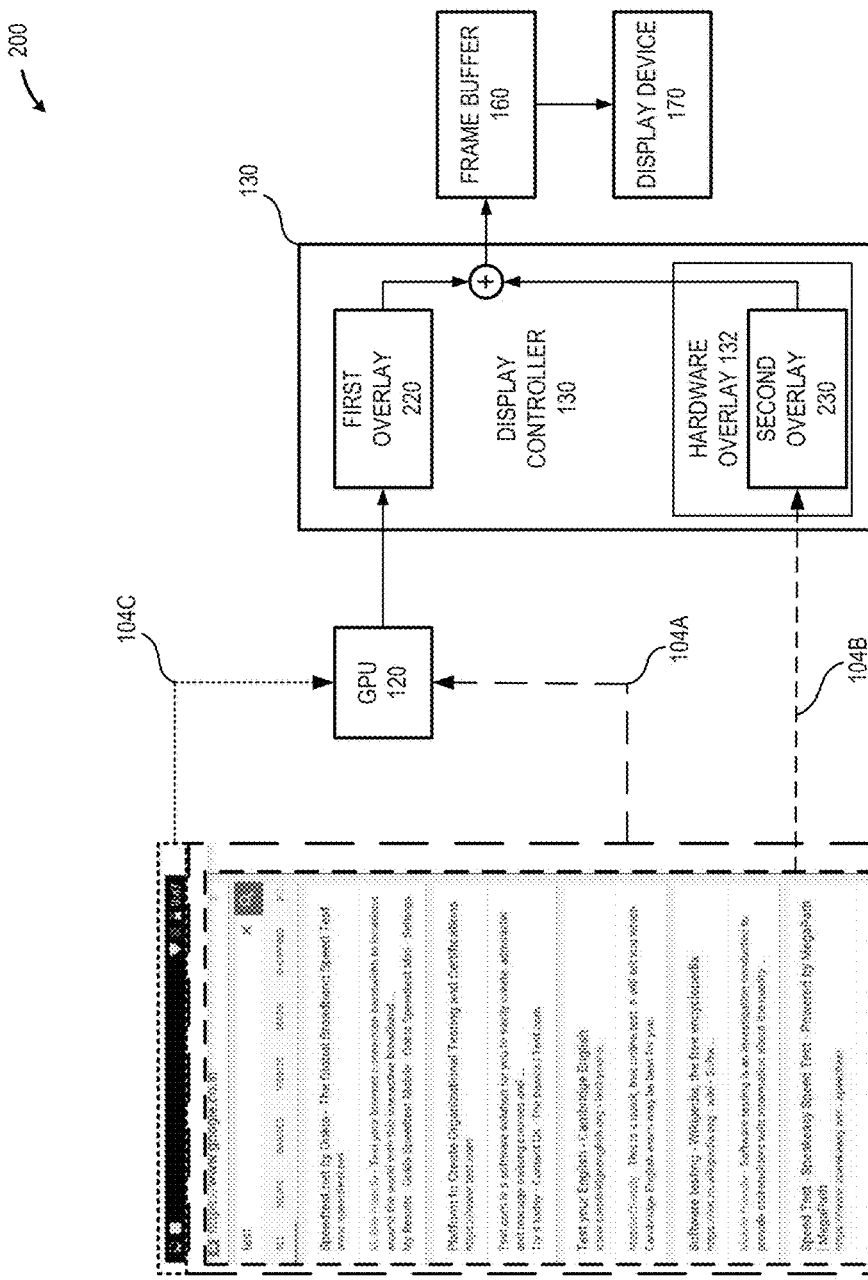
FIG. 2 is a schematic that includes a Google® Chrome browser composition of an illustrative display frame that includes the display frame layers, in accordance with at least one embodiment described herein.

FIG. 2 depicts a Google® Chrome browser composition of an illustrative display frame 200 that includes three layers 104A, 104B, and 104C, in accordance with at least one embodiment described herein. The three layers 104 included in the browser display frame 200 include: Layer 1—the surface view (bottom layer) 104A; Layer 2—the browser tab activity (middle layer) 104B; and, Layer 3—the status bar (top layer) 104C. The most rapidly changing layer is the browser tab activity layer 104B. The surface view layer 104A and the status bar layer 104C do not change as frequently.

In embodiments, the frame composition controller circuit 140 identifies the browser tab activity layer 104B (i.e., Layer 2) as having the greatest frame-to-frame change rate value and thus, placing the greatest prospective composition load on the GPU 120. The frame composition controller circuit 140 also identifies the surface view layer 104A (i.e., Layer 1) and the status bar layer 104C (i.e., Layer 3) as layers that are unchanging and/or static frame-to-frame and thus present the least prospective composition load on the GPU 120. The frame composition controller circuit 140 also determines that the browser tab activity layer 104B does not overlap the status bar display frame layer 104C. Based on the determined prospective GPU load and the lack of overlap between the browser tab activity layer 104B and the status bar layer 104C, the frame composition controller circuit 140 causes the GPU 120 to compose the surface view layer 104A (i.e., Layer 1) and the status bar layer 104C (i.e., Layer 3) using OpenGLIES to provide a first overlay 220 to the display controller circuit 130. Further, the frame composition controller circuit 140 causes the hardware overlay 132 to compose the browser tab activity layer 104B (i.e., Layer 2) to provide a second overlay 230 to the display controller circuit 130. The display controller circuit 130 then composites the first overlay 220 and the second overlay 230 to generate a display frame 102 that is communicated to the frame buffer 160.

In embodiments, where the surface view layer 104A and the status bar layer 104C remain static or unchanging, the previously composed surface view layer 104A and the previously composed status bar layer 104C may be passed by the GPU 120 directly to the display controller circuit 130 as the first frame overlay 220. By eliminating the need to compose the surface view layer 104A and the status bar layer 104C, the computational load placed on the GPU 120 is minimized. The display controller circuit 130 composites the first frame overlay 220 and the second frame overlay 230 to provide a display frame 102 to the display frame buffer 160 for display on the display device 170.

Figure 3:
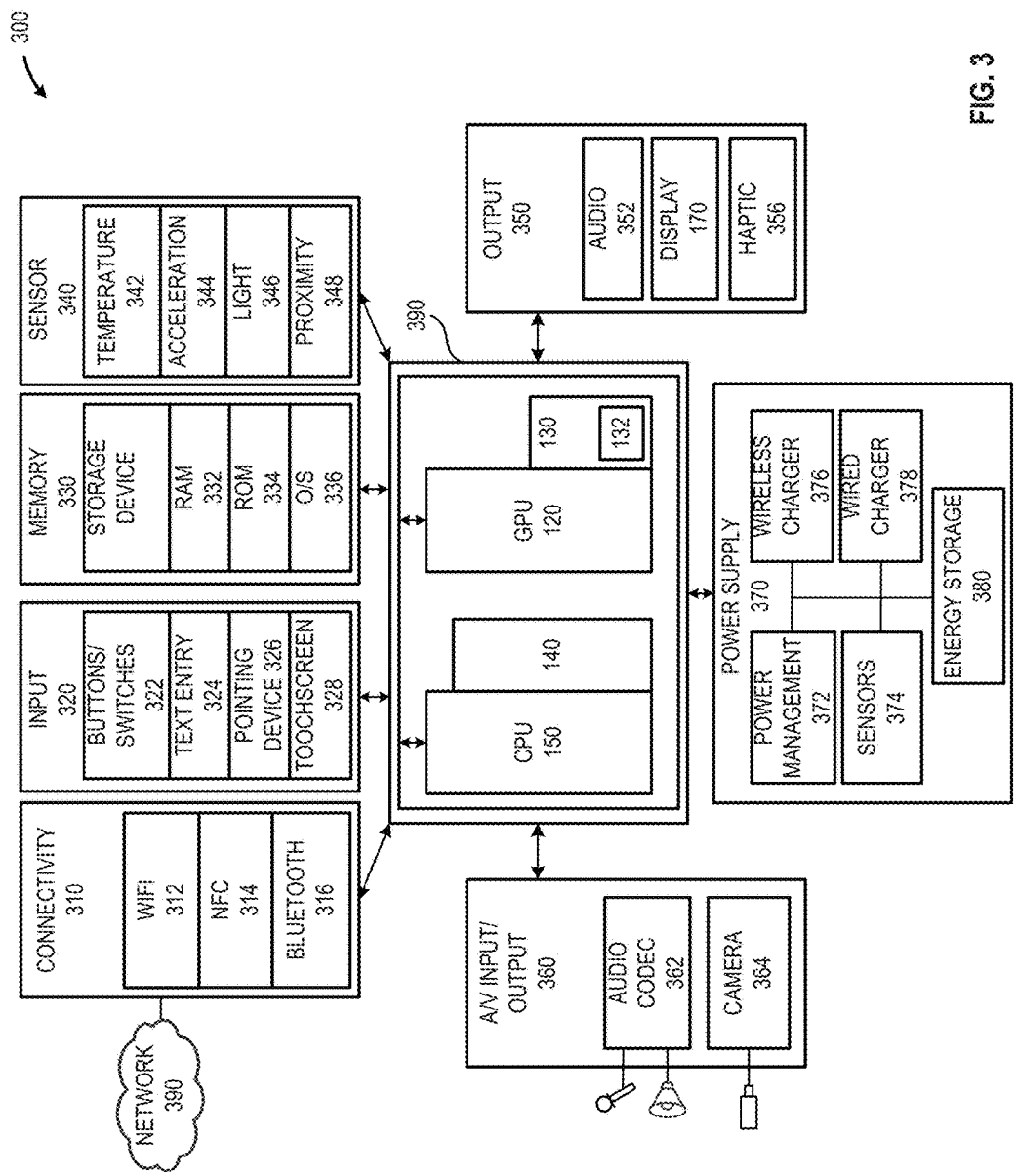
FIG. 3 is a block diagram of a processor-based device that includes a frame composition controller circuit to provide smart composition of display output layers, in accordance with at least one embodiment of the present disclosure.

FIG. 3 depicts a block diagram of a processor-based device 300 that includes a frame composition controller circuit 140 to provide smart composition of layers 104, in accordance with at least one embodiment of the present disclosure. The processor-based device 300 may include one or more of the following: a connectivity subsystem 310; an input subsystem 320; a memory subsystem 330; a sensor subsystem 340; an output subsystem 350; an audio/visual (A/V) input/output (I/O) system 360; and a power supply subsystem 370. The various subsystems may be communicably coupled to the graphic processing unit 120, the display controller circuit 130, the hardware overlay circuit 132, the frame composition controller circuit 140, and the central processing unit 150 via one or more communications links 390. For example, via one or more serial or parallel buses or similar pathways capable of supporting the transfer of digital information and/or data between components, modules, subsystems, or devices in the processor-based device 300.

The connectivity subsystem 310 may include any number and/or combination of wired and/or wireless transmitters, receivers, and/or transceivers. Example transceivers include, but are not limited to, one or more IEEE 802.11 (Wi-Fi®) transceivers 312; one or more Near Field Communication (NFC) transceivers 314; one or more BLUETOOTH® transceivers 316; or any combination thereof. In at least some implementations, the connectivity subsystem 310 enables the processor-based device 300 to communicably couple to one or more external devices via one or more networks 390. The one or more networks 390 may include, but are not limited to, one or more local area networks (LANs); one or more metropolitan area networks (MANs); one or more virtual private networks (VPNs); one or more wide area networks (WANs); and/or one or more worldwide are networks (WWANs, such as the Internet). In at least some implementations, updates to the global machine learning model may be received via the one or more networks 390.

The input subsystem 320 may include any number and/or combination of devices and/or systems capable of receiving user input and providing one or more signals including information and/or data corresponding to the received user input to the CPU 150. The input subsystem 320 may include input devices such as one or more buttons or switches 322; one or more keyboards or similar text entry devices 324; one or more pointing devices 326; and/or one or more touchscreens 328.

The memory subsystem 330 may include any number and/or combination of devices and/or systems capable of storing or otherwise retaining digital information and/or data. The memory subsystem 330 may include random access memory (RAM) 332 and/or read-only memory (ROM) 334 in a fixed or removable format. In some implementations, the memory subsystem 330 may store or otherwise retain machine-readable instruction sets such as instructions that transform one or more circuits to a particular frame composition controller circuit 140 capable of managing the allocation of frame layers 104 between the GPU 120 and the display controller circuit 130.

The memory subsystem 330 may include memory configured to hold information and/or data generated during the operation of processor-based device 300. Such memory may include, but is not limited to, static RAM (SRAM) or Dynamic RAM (DRAM). The ROM 334 may include storage devices such as basic input/output system (BIOS) memory configured to provide instructions when the processor-based device 300 activates, programmable memories such as electronic programmable ROMs, (EPROMS), Flash, etc. The memory subsystem 330 may include other fixed and/or removable memory such as floppy disks, hard drives, etc., electronic memories such as solid state flash memory (e.g., eMMC), removable memory cards or sticks (e.g., uSD, USB), optical memories such as compact disc-based ROM (CD-ROM), or combinations thereof.

The sensor subsystem 340 may include any number and/or combination of devices and/or systems capable of detecting one or more internal and/or external parameters and/or conditions and generating one or more signals containing information and/or data representative of the respective detected parameter and/or condition. The sensor subsystem 340 may include, but is not limited to, one or more temperature sensors 342; one or more acceleration sensors 344; one or more light sensors 346; one or more proximity sensors 348; or combinations thereof.

The output subsystem 350 may include any number and/or combination of devices and/or systems capable of generating one or more user perceptible outputs. The output subsystem 350 may include: one or more audio output device 352, one or more display devices 170, one or more haptic output devices 356, or combinations thereof.

The A/V Input/Output (I/O) subsystem 360 may include any number and/or combination of current and/or future developed devices and/or systems capable of receiving and/or transmitting audio data and/or video data. The A/V I/O system 360 may include, but is not limited to, one or more audio coders; one or more audio decoders; one or more audio codecs 362; one or more video capture devices 364; or combinations thereof. In some implementations, the one or more video capture devices may include one or more visible spectrum video capture devices and/or one or more infrared video capture devices.

The power supply subsystem 370 may include any number and/or combination of any current and/or future developed devices and/or systems capable of providing the processor-based device 300 with operating power. The power supply subsystem 370 may include, but is not limited to, one or more power management control circuits 372; one or more power sensors 374 (voltage sensors, current sensors, etc.); one or more wireless charging systems 376; one or more wired charging systems 378; one or more energy storage devices 380 (secondary batteries, supercapacitors, ultracapacitors, etc.) or combinations thereof.

Figure 4:
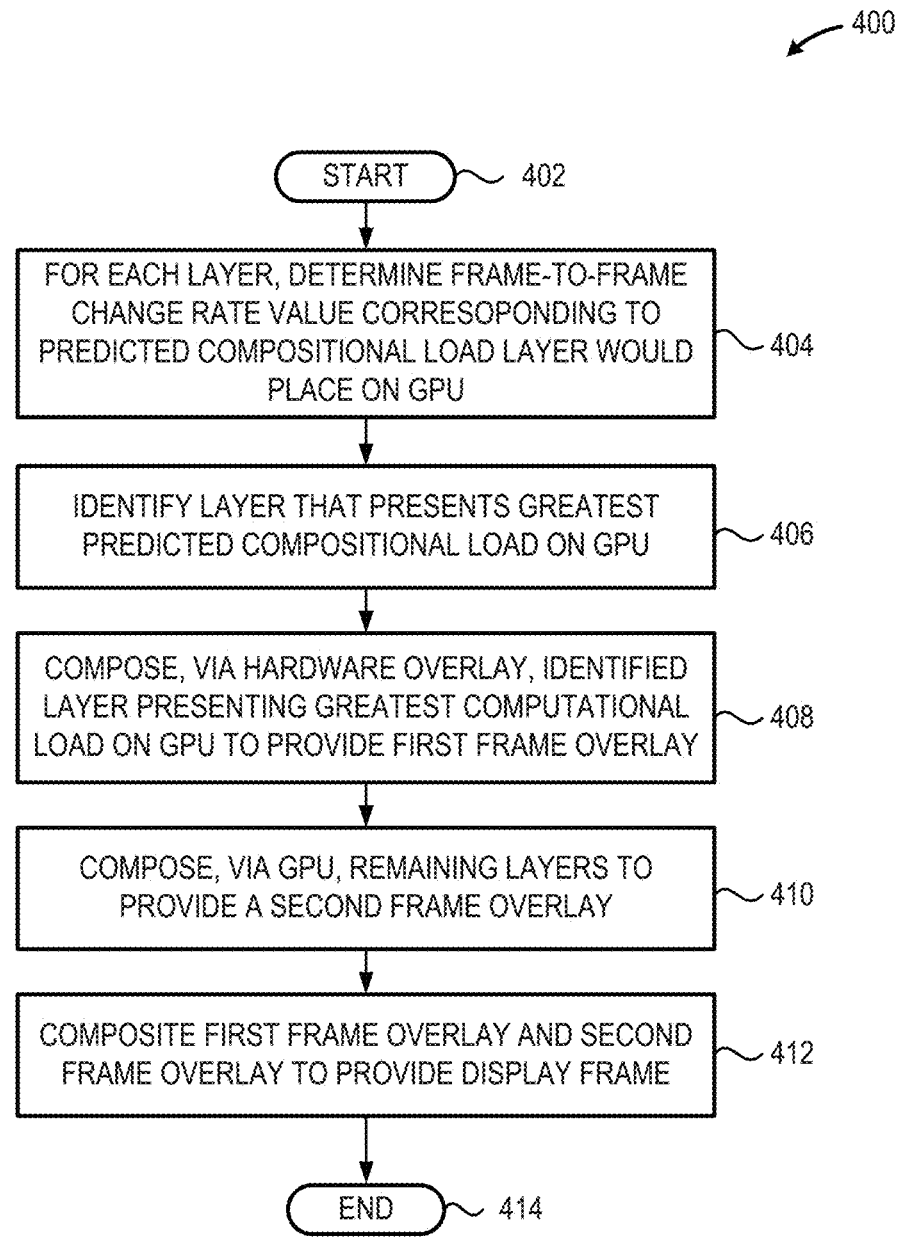
FIG. 4 is a flow diagram of an illustrative output layer composition method in which a frame composition controller circuit allocates display frame layers to a GPU and a display controller circuit based at least in part on the prospective load each of the display frame layers places on the GPU, in accordance with at least one embodiment described herein.

FIG. 4 is a flow diagram of an illustrative output layer composition method 400 in which a frame composition controller circuit 140 determines a frame-to-frame change rate value for each layer in a plurality of layers 104, causes a hardware overlay circuit to compose the layer identified as presenting the greatest compositional load on the GPU 120 and assigns the composed layer to a first frame overlay 220, and causes the GPU to compose at least a portion of the remaining layer(s) 104 and assigns the composed layers to a second frame overlay 230, in accordance with at least one embodiment described herein. In implementations, the frame composition controller circuit 140 assesses each layer 104 to determine a frame-to-frame change rate value indicative of a prospective compositional load the respective layer 104 would place on a GPU 120 if the layer 104 were composed by the GPU 120 using OpenGLIES. Based on the determined prospective load, the frame composition controller circuit 140 causes the hardware overlay 132 to compose the layer 104 identified as placing the greatest predicted compositional load on the GPU 120 and the GPU to compose the remaining layers 104. The method 400 commences at 402.

At 404, for each layer 104 included in a plurality of layers 104A-104*n*, the frame composition controller circuit 140 determines a frame-to-frame change rate value corresponding to the predicted or prospective compositional load the respective layer 104 would place on the GPU 120 if the respective layer 104 were composed by the GPU 120 using OpenGLIES or a similar graphical application programming interface (API). In some implementations, the frame composition controller circuit 140 may determine the frame-to-frame change rate value based, at least in part, on information and/or data included in the buffer handle 106 logically associated with the respective layer 104. In some implementations, the predicted or prospective load placed on the GPU 120 by the display frame layer 104 may be based, at least in part, on the size of the layer 104, the location of the layer 104 on the display device 170, the frame-to-frame change in content of the layer 104, or combinations thereof.

At 406, the frame composition controller circuit 140 identifies the layer 104 placing the greatest predicted or prospective compositional load on the GPU 120. In some implementations, the frame composition controller circuit 140 may sort the display frame layers 104 by the frame-to-frame change rate value corresponding to the predicted or prospective compositional load each layer would place on the GPU 120.

At 408, the frame composition controller circuit 140 causes the hardware overlay 132 to compose the layer 104 identified as placing the greatest potential computational load on the GPU 120. The display controller circuit 130 assigns the respective composed layer 104 to a first frame overlay 220.

At 410, the frame composition controller circuit 140 causes the GPU 120 to compose at least a portion of the remaining layers 104 included in the plurality of layers 104A-104*n*. The display controller circuit 130 assigns the respective composed layers to a second frame overlay 230.

At 412, the display controller circuit 130 composites the first frame overlay and the second frame overlay to generate a display frame 102. The display frame 102 may be communicated to a display frame buffer 160 prior to display on a display device 170. The method 400 concludes at 414.

Figure 5:
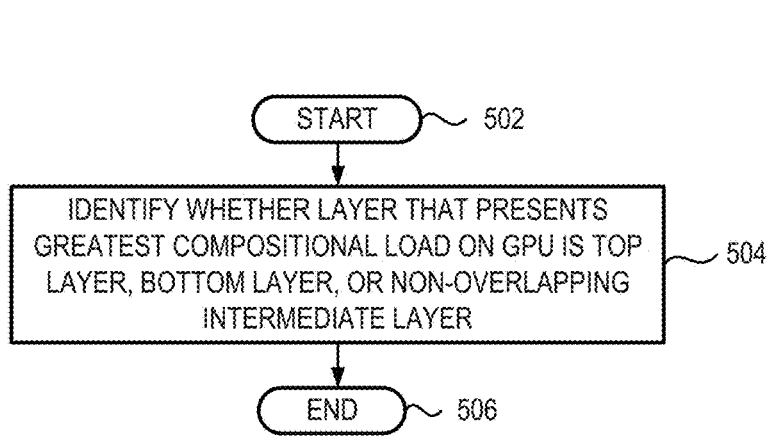
FIG. 5 is a flow diagram of an illustrative output layer composition method that may be performed in conjunction with the method depicted in FIG. 4, in accordance with at least one embodiment described herein.

FIG. 5 is a flow diagram of an illustrative identification method 500 that may be performed in conjunction with the method 400 depicted in FIG. 4, in accordance with at least one embodiment described herein. In some implementations, in addition to identifying the layer 104 that would present the greatest predicted or prospective compositional load on the GPU 120, the frame composition controller circuit 140 may also determine whether the identified layer that would place the greatest predicted or prospective compositional load on the GPU 120 are at a location within the z-order 108 that places the respective layer 104 as the uppermost layer 104A, the lowermost layer 108*n*, or as an intermediate layer 104. The method 500 commences at 502.

At 504, the frame composition controller circuit 140 examines the z-order 108 of the plurality of layers 104 and determines whether the layer that would present the greatest predicted or prospective compositional load on the GPU 120 includes at least one of: the uppermost layer 104A, the lowermost layer 104C, or an intermediate layer 104B. If the frame composition controller circuit 140 identifies the layer 104 as an intermediate layer 104, the frame composition controller circuit 140 may further determine whether the respective layer 104 overlays all or a portion of one or more layers 104 positioned in the z-order 108 above the respective layer 104.

If the layer 104 that would place the greatest predicted or prospective load on the GPU 120 is identified as the uppermost layer 104A or the lowermost layer 104C, the frame composition controller circuit 140 forwards the respective layer 104 to the display controller circuit 130 for composition by the hardware overlay 132.

If the layer 104 that would place the greatest predicted or prospective load on the GPU 120 is identified as an intermediate layer in the z-order 108, the frame composition controller circuit 140 determines whether the respective layer 104 overlays or overlaps in whole or in part one or more layers 104 positioned or otherwise located above the respective layer in the z-order 108. If the frame composition controller circuit 140 determines the respective layer does not overlay or overlap any other layer 104 positioned in the z-order 108 above the respective layer, the frame composition controller circuit 140 causes the hardware overlay 132 to compose the respective layer. If the frame composition controller circuit 140 determines the respective layer 104 does overlay or overlap any other layer 104 positioned in the z-order 108 above the respective layer, the frame composition controller circuit 140 causes the GPU 120 to compose the respective layer. The method 500 concludes at 506.

Figure 6:
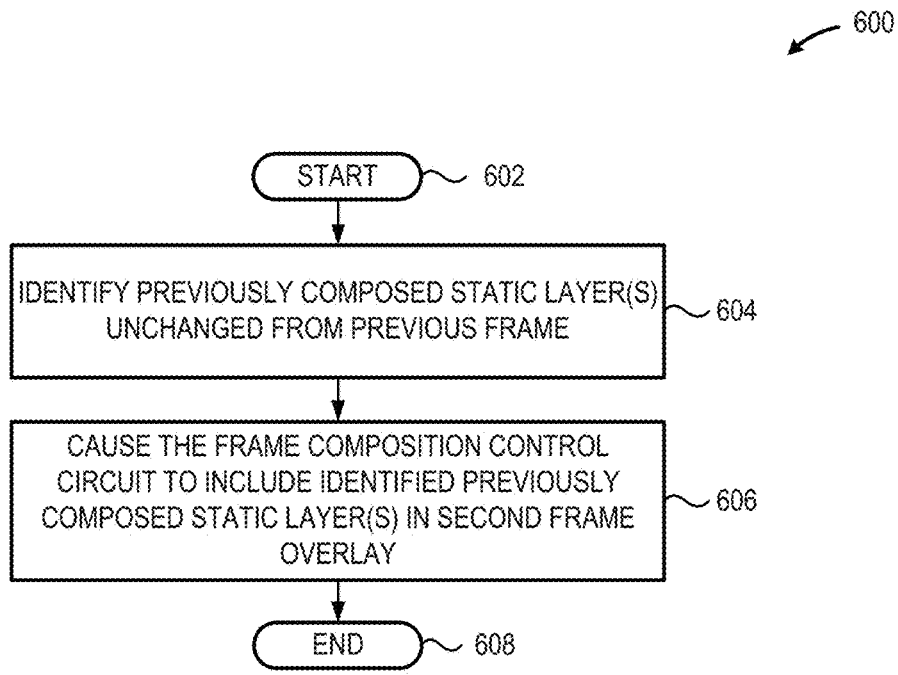
FIG. 6 is a flow diagram of an illustrative output layer composition method that may be performed in conjunction with either or both the method depicted in FIG. 4 and/or the method depicted in FIG. 5, in accordance with at least one embodiment described herein.

FIG. 6 is a flow diagram of an illustrative method 600 that may be performed in conjunction with either or both the method 400 depicted in FIG. 4 and/or the method 500 depicted in FIG. 5, in accordance with at least one embodiment described herein. In implementations, some previously composed and/or composited display frame layers 104 may remain unchanged or static from frame-to-frame. In such instances time and power may be conserved by reusing the previously composited frame overlay(s) that include the set of unchanging previously composed/composited layers 104. The method 600 commences at 602.

At 604, the frame composition controller circuit 140 identifies those previously composed layers 104 within the plurality of layers 104 that are unchanged from the immediately preceding frame. The frame composition controller circuit 140 also determines whether the position of the unchanging, previously composed, layers 104 remains the same within the z-order 108 from frame-to frame.

At 606, the frame composition controller circuit 140 causes the GPU 120 to include the identified unchanging, previously composed layers 104 in the second frame overlay 230. In some implementations, the GPU 120 may include the identified unchanging, previously composed layers 104 in the second frame overlay 230 without additional composition (i.e., the unchanging, previously composed, layers 104 in the second frame overlay 230 may be used directly by the display controller circuit 130, without additional compositional processing by the GPU 120), thereby reducing the compositional load placed on the GPU 120 and improving system efficiency and responsiveness. The method concludes at 610.

Figure 7A:
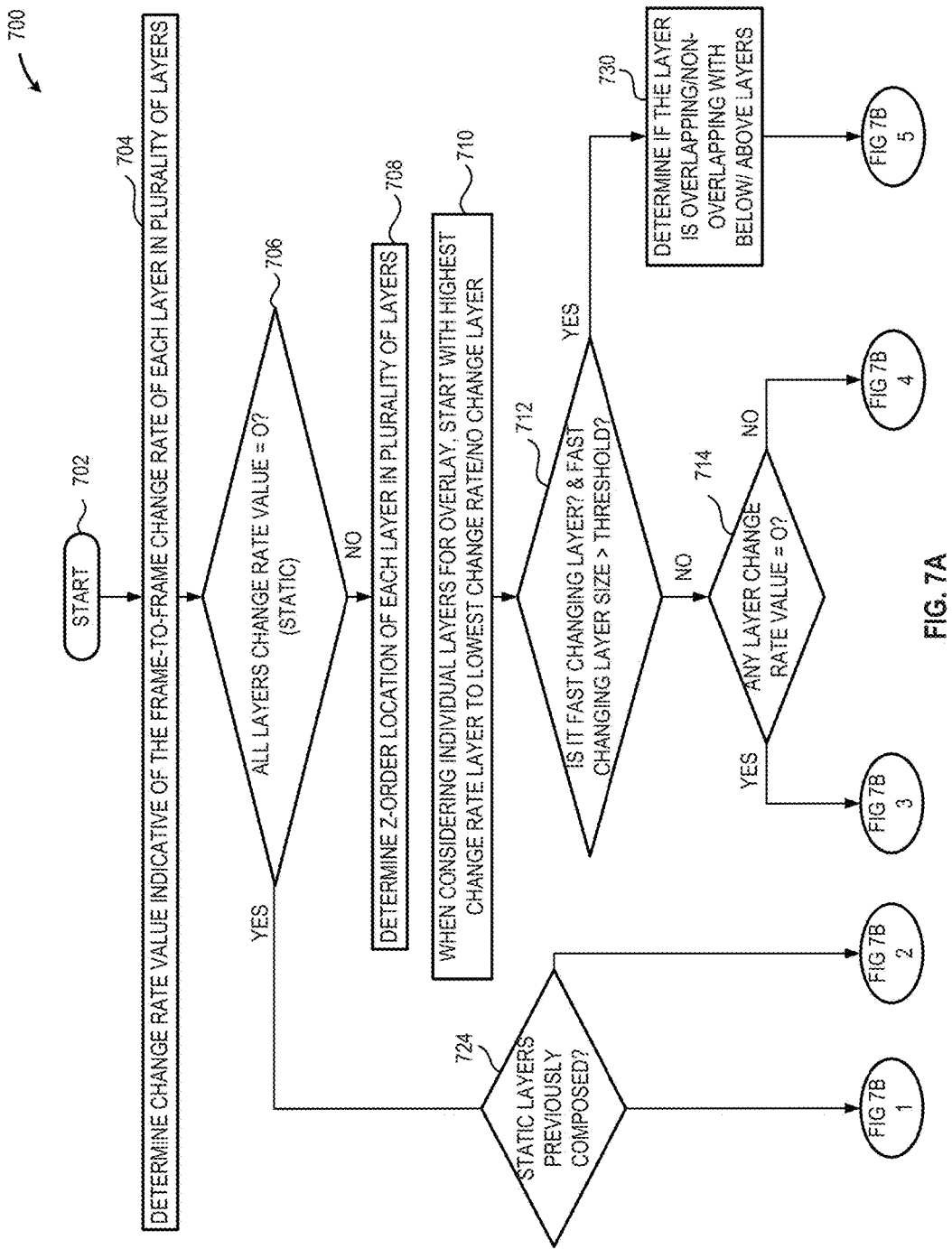
FIG. 7A is a flow diagram of an illustrative comprehensive output layer composition method, in accordance with at least one embodiment described herein.
Figure 7B:
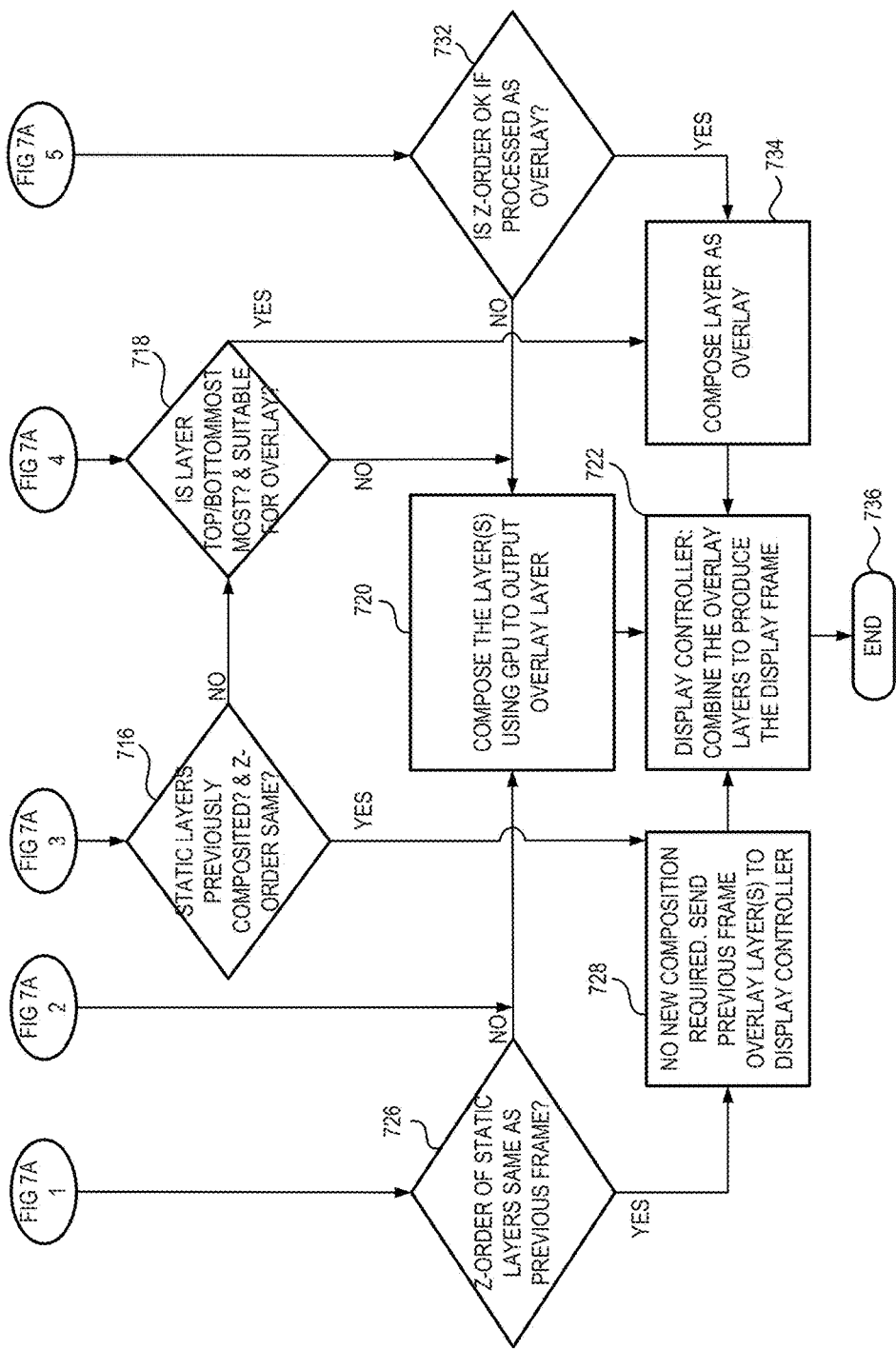
FIG. 7B is a continuation of the illustrative comprehensive output layer composition method in FIG. 7A, in accordance with at least one embodiment described herein.

FIG. 7A is a flow diagram of an illustrative comprehensive output layer composition method 700, in accordance with at least one embodiment described herein. FIG. 7B is a continuation of the illustrative comprehensive output layer composition method 700 in FIG. 7A, in accordance with at least one embodiment described herein. The method 700 commences at 702.

At 704, for each layer 104 included in a plurality of layers 104A-104n, the frame composition controller circuit 140 determines a frame-to-frame change rate value that corresponds to the predicted or prospective compositional load the respective display frame layer 104 would place on the GPU 120 if composed using OpenGLIES, or a similar graphical API, in the GPU 120. In some implementations, the frame composition controller circuit 140 may determine the predicted or prospective compositional value based, at least in part, on information and/or data included in the buffer handle 106 logically associated with the respective layer 104. In some implementations, the predicted or prospective compositional load placed on the GPU 120 by the display frame layer 104 may be based, at least in part, on the size of the layer 104, the location of the layer 104 on the display device 170, the frame-to-frame change in content of the layer 104, or combinations thereof.

At 706, the frame composition controller circuit 140 determines whether the frame-to-frame change rate value for all of the layers 104 included in the plurality of layers 104A-104n is zero. Such would indicate the current display frame 102 is identical to the immediately preceding display frame 102. If the frame composition controller circuit 140 determines the frame-to-frame change rate value for all of the layers 104 included in the plurality of layers 104A-104n is zero, the method 700 continues at 724. If the frame composition controller circuit 140 determines the frame-to-frame change rate value for all of the layers 104 included in the plurality of layers 104A-104n is non-zero, the method 700 continues at 708.

At 708, the frame composition controller circuit 140 determines the location in the z-order 108 of each layer 104 included in the plurality of layers 104A-104n.

At 710, the frame composition controller circuit 140 orders the layers 104 from those having the greatest or highest frame-to-frame change rate value to the least or lowest frame-to-frame change rate value.

At 712, the frame composition controller circuit 140 determines whether the frame size of the one or more layers 104 having the greatest frame-to-frame change rate value equals or exceeds a defined frame size value. If the frame size of the one or more layers 104 having the greatest frame-to-frame change rate value fails to equal or exceed the defined frame size value, the method 700 proceeds to 714. If the frame size of the one or more layers 104 having the greatest frame-to-frame change rate value equals or exceeds the defined frame size value, the method 700 proceeds to 730.

At 714, the frame composition controller circuit 140 determines whether any of the layers 104 included in the plurality of layers 104A-104n have a frame-to-frame change rate value of zero (i.e., do any of the layers 104 remain static or unchanged from frame-to-frame). If the frame composition controller circuit 140 determines a layer 104 has a frame-to-frame change rate value of zero, the method 700 continues at 716. If the frame composition controller circuit 140 determines that none of the display frame layers 104 have a frame-to-frame change rate value of zero, the method 700 continues at 718.

At 716, responsive to determining that the layer 104 has a frame-to-frame change rate value of zero at 714, the frame composition controller circuit 140 determines whether the layer 104 having a frame-to-frame change rate value equal to zero is in the same z-order 108 as the immediately preceding display frame 102, and whether the layer 104 having a frame-to-frame change rate value equal to zero has been previously composited. If the layer 104 having a frame-to-frame change rate value equal to zero is in a different z-order 108 than the immediately preceding display frame 102 or the layer 104 having a frame-to-frame change rate value equal to zero has not been previously composited, the method 700 continues at 718. If the layer 104 having a frame-to-frame change rate value equal to zero is in the same z-order 108 and has been previously composited, the method 700 continues at 728.

At 718, responsive to determining that layer 104 has a non-zero frame-to-frame change rate at 714 or responsive to determining the layer 104 having a frame-to-frame change rate value equal to zero is in a different z-order 108 than the immediately preceding display frame 102 or the layer 104 having a frame-to-frame change rate value equal to zero has not been previously composited, the frame composition controller circuit 140 determines whether the layer 104 having the greatest frame-to-frame change rate includes one of: the uppermost layer 104A or the lowermost layer 104n. If the layer 104 having the greatest frame-to-frame change rate does not include the uppermost layer 104A or the lowermost layer 104n, then the method 700 continues at 720. If the layer 104 having the greatest frame-to-frame change rate does include either the uppermost layer 104A or the lowermost layer 104n, then the method 700 continues at 734.

At 720, responsive to determining the layer 104 having the greatest frame-to-frame change rate does not include the uppermost layer 104A or the lowermost layer 104n, the frame composition controller circuit 140 forwards the layer 104 to the GPU 120 to generate at least a first frame overlay.

At 722, the display controller circuit 130 combines the frame overlays to provide a display frame 102 to the display frame buffer 160.

At 724, responsive to determining at 706 that the frame-to-frame change rate value for all of the layers 104 included in the plurality of layers 104A-104n is zero, the frame composition controller circuit 140 determines whether all of the layers 104A-104n have been previously composed by either or both the GPU 120 and/or the hardware overlay 132. If the frame composition controller circuit 140 determines all of the display frame layers 104A-104n have been previously composed by either or both the GPU 120 and/or the hardware overlay 132, the method 700 proceeds to 726. If the frame composition controller circuit 140 determines all of the layers 104A-104n have not been previously composed by either or both the GPU 120 and/or the hardware overlay 132, the method 700 returns to 720.

At 726, responsive to determining at 724 that the layers 104A-104n have been previously composed by either or both the GPU 120 and/or the hardware overlay 132, the frame composition controller circuit 140 determines whether the z-order 108 of the layers 104 having a frame-to-frame change rate value of zero is identical to the immediately preceding display frame 102. If the frame composition controller circuit 140 determines the z-order 108 of the layers 140 is identical to the immediately preceding display frame 102, the method 700 proceeds to 728. If the frame composition controller circuit 140 determines the z-order 108 of the layers 140 is not identical to the immediately preceding display frame 102, the method 700 returns to 720.

At 728, responsive to determining that all of the layers 104A-104n have been previously composed by either or both the GPU 120 and/or the hardware overlay 132 and that the z-order 108 of the layers 104 is identical to the immediately preceding display frame 102, the frame composition controller circuit 140 generates a frame overlay that includes the layers 104 having a frame-to-frame change rate value of zero. After generating the frame overlay, the method 700 continues at 722 frame overlay is composited to provide the display frame 102.

At 730, responsive to determining at 712 that the frame size of the layer 104 having the greatest frame-to-frame change rate value equals or exceeds the defined frame size value, the frame composition controller circuit 140 determines whether the layer 104 having the greatest frame-to-frame change rate value is an intermediate layer in the z-order 108 and whether the layer 104 having the greatest frame-to-frame change rate value overlaps or overlays one or more display frame layers 104 above or below the respective identified layer 104.

At 732, the frame composition controller circuit 140 determines whether the z-order 108 of the layer 104 having the greatest frame-to-frame change rate value is one of: the uppermost layer 104A in the z-order 108; the lowermost layer 104n in the z-order 108; or an intermediate layer 104 in the z-order 108 that does not overlap with any of the layers 104 positioned above the respective layer 104x in the z-order 108. If the layer 104 having the greatest frame-to-frame change rate value includes one of: the uppermost layer 104A in the z-order 108; the lowermost layer 104n in the z-order 108; or an intermediate display frame layer 104 in the z-order 108 that does not overlap with any of the layers 104 positioned above the respective layer 104x in the z-order 108, the method 700 continues at 734. If the layer 104 having the greatest frame-to-frame change rate value does not include one of: the uppermost layer 104A in the z-order 108; the lowermost layer 104n in the z-order 108; or an intermediate display frame layer 104 in the z-order 108 that does not overlap with any of the layers 104 positioned above the respective layer 104x in the z-order 108, the method 700 returns to 720.

At 734, the frame composition controller circuit 140 causes the display controller circuit 130 to composite the one or more layers 104 having the greatest frame-to-frame change rate value as a frame overlay. After generating the frame overlay, the method 700 continues at 722 where the frame overlays are combined to provide the display frame 102. The method 700 concludes at 736.

Additionally, operations for the embodiments have been further described with reference to the above figures and accompanying examples. Some of the figures may include a logic flow. Although such figures presented herein may include a particular logic flow, it can be appreciated that the logic flow merely provides an example of how the general functionality described herein can be implemented. Further, the given logic flow does not necessarily have to be executed in the order presented unless otherwise indicated. The embodiments are not limited to this context.

Various features, aspects, and embodiments have been described herein. The features, aspects, and embodiments are susceptible to combination with one another as well as to variation and modification, as will be understood by those having skill in the art. The present disclosure should, therefore, be considered to encompass such combinations, variations, and modifications. Thus, the breadth and scope of the present invention should not be limited by any of the above-described exemplary embodiments, but should be defined only in accordance with the following claims and their equivalents.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents. Various features, aspects, and embodiments have been described herein. The features, aspects, and embodiments are susceptible to combination with one another as well as to variation and modification, as will be understood by those having skill in the art. The present disclosure should, therefore, be considered to encompass such combinations, variations, and modifications.

Reference throughout this specification to "one embodiment" or "an embodiment" means that a particular feature, structure, or characteristic described in connection with the embodiment is included in at least one embodiment. Thus, appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

According to example 1, there is provided a system to selectively compose layers via system hardware. The system may include: a graphical processing unit (GPU); a display controller circuit, including a hardware overlay circuit, communicably coupled to the GPU; and a frame composition controller circuit communicably coupled to the GPU and to the display controller circuit, the frame composition controller circuit to: for each layer included in a plurality of layers that form a display frame, determine a frame-to-frame change rate value that corresponds to a predicted compositional load the respective layer would place on the GPU; identify layer having a frame-to-frame change rate value corresponding to placing the greatest predicted compositional load on the GPU; cause the hardware overlay circuit to compose the layer having the frame-to-frame change rate value indicative of placing the greatest predicted compositional load on the GPU to provide at least one first frame overlay; cause the GPU to compose at least a portion of the remaining layers included in the plurality of layers to provide a second frame overlay; and cause the display controller to composite the first frame overlay and the second frame overlay to provide the display frame.

Example 2 may include elements of example 1 and the display controller circuit may further identify whether the layer the frame-to-frame change rate value corresponding to placing the greatest predicted compositional load on the GPU is also at least one of: a z-order uppermost layer in the plurality of layers; a z-order lowermost layer in the plurality of display frame layers; or a non-overlapping, z-order intermediate layer in the plurality of display frame layers that does not overlap any of the layers positioned above layer in the z-order.

Example 3 may include elements of example 1 and the display controller circuit may further determine a frame-to-frame change rate value corresponding to a predicted compositional load placed on the GPU based on the size of the respective layer.

Example 4 may include elements of example 3 and the display controller circuit may further determine a frame-to-frame change rate value corresponding to a predicted compositional load placed on the GPU based on a percentage of display elements changing from frame-to-frame in the respective layer.

Example 5 may include elements of example 4 and the display controller circuit may further determine a frame-to-frame change rate value corresponding to a predicted compositional load placed on the GPU based on a percentage of pixels changing from frame-to-frame in the respective layer.

Example 6 may include elements of example 1 and the display controller circuit may identify previously composed static layers in the remaining display frame members, each of the previously composed static layers characterized by: a frame-to-frame change rate value indicative of no changes frame-to-frame; and no change in z-order location frame-to-frame; and cause the GPU to: avoid composing the identified previously composed static layers; and include the identified previously composed static layers in the second frame overlay.

According to example 7, there is provided a method of selectively composing layers via system hardware. The method may include, for each layer included in a plurality of layers that form a display frame, determining, by a frame composition controller circuit, a frame-to-frame change rate value corresponding to a predicted compositional load the respective layer would place on a graphical processing unit (GPU); identifying a layer having a frame-to-frame change rate value corresponding to placing the greatest predicted compositional load on the GPU; causing a hardware overlay circuit coupled to a display controller circuit to compose the layer identified as having the frame-to-frame change rate value corresponding to placing the greatest predicted compositional load on the GPU to provide a first frame overlay; causing the GPU to compose at least a portion of the remaining layers included in the plurality of layers to provide a second frame overlay; and causing the display controller circuitry to composite the first frame overlay and the second frame overlay to provide the display frame.

Example 8 may include elements of example 7 and the method may additionally include determining whether the layer having the frame-to-frame change rate value corresponding to placing the greatest predicted compositional load on the GPU is also at least one of: a z-order uppermost layer in the plurality of layers; a z-order lowermost layer in the plurality of layers; or a non-overlapping, z-order intermediate layer in the plurality of layers that does not overlap any of the layers positioned above the respective layer in the z-order.

Example 9 may include elements of example 7 where determining a frame-to-frame change rate value corresponding to placing the greatest predicted compositional load on the GPU may include determining a frame-to-frame change rate value corresponding to a predicted compositional load placed on the GPU based on the size of the respective layer.

Example 10 may include elements of example 9 where determining a frame-to-frame change rate value corresponding to placing the greatest predicted compositional load on the GPU may further include determining a frame-to-frame change rate value corresponding to a predicted compositional load placed on the GPU based on a percentage of display elements changing from frame-to-frame in the respective layer.

Example 11 may include elements of example 10 where determining a frame-to-frame change rate value corresponding to a predicted compositional load placed on the GPU based on a percentage of display elements changing from frame-to-frame may include determining a frame-to-frame change rate value corresponding to a predicted compositional load placed on the GPU based on a percentage of pixels changing from frame-to-frame in the respective layer.

Example 12 may include elements of example 9 and the method may further include identifying previously composed static layers in the remaining display frame members, each of the previously composed static layers characterized by: a frame-to-frame change rate value indicative of no changes frame-to-frame; and no change in z-order location frame-to-frame; and the method may further include causing the GPU to: avoid composing the identified previously composed static layers; and include the identified previously composed static layers in the second frame overlay.

According to example 13, there is provided a system for selectively composing layers via system hardware. The system may include: a means for determining, for each layer included in a plurality of layers that form a display frame, a frame-to-frame change rate value corresponding to a predicted compositional load the respective layer would place on a graphical processing unit (GPU); a means for identifying a layer having a frame-to-frame change rate value corresponding to placing the greatest predicted compositional load on the GPU; a means for causing a hardware overlay circuit coupled to a display controller circuit to compose the layer identified as having the frame-to-frame change rate value corresponding to placing the greatest predicted compositional load on the GPU to provide a first frame overlay; a means for causing the GPU to compose at least a portion of the remaining layers included in the plurality of layers to provide a second frame overlay; and a means for causing the display controller circuitry to composite the first frame overlay and the second frame overlay to provide the display frame.

Example 14 may include elements of example 13 and the system may further include a means for determining whether the layer having the frame-to-frame change rate value corresponding to placing the greatest predicted compositional load on the GPU is also at least one of: a z-order uppermost layer in the plurality of layers; a z-order lowermost layer in the plurality of layers; or a non-overlapping, z-order intermediate layer in the plurality of layers that does not overlap any of the layers positioned above the respective layer in the z-order.

Example 15 may include elements of example 13 where the means for determining a frame-to-frame change rate value corresponding to placing the greatest predicted compositional load on the GPU may include a means for determining a frame-to-frame change rate value corresponding to a predicted compositional load placed on the GPU based on the size of the respective layer.

Example 16 may include elements of example 15 where the means for determining a frame-to-frame change rate value corresponding to placing the greatest predicted compositional load on the GPU may further include a means for determining a frame-to-frame change rate value corresponding to a predicted compositional load placed on the GPU based on a percentage of display elements changing from frame-to-frame in the respective layer.

Example 17 may include elements of example 16 where the means for determining a frame-to-frame change rate value corresponding to a predicted compositional load placed on the GPU based on a percentage of display elements changing from frame-to-frame may include a means for determining a frame-to-frame change rate value corresponding to a predicted compositional load placed on the GPU based on a percentage of pixels changing from frame-to-frame in the respective layer.

Example 18 may include elements of example 13 and the system may further include a means for identifying previously composed static layers in the remaining display frame members, each of the previously composed static layers characterized by: a frame-to-frame change rate value indicative of no changes frame-to-frame; and no change in z-order location frame-to-frame; and the system may additionally include a means for causing the GPU to: avoid composing the identified previously composed static layers; and include the identified previously composed static layers in the second frame overlay.

According to example 19, there is provided a non-transitory computer readable medium that includes instructions that when executed by a circuit cause the circuit to provide a frame composition controller circuit. The frame composition controller circuit may: determine, for each layer included in a plurality of layers that form a display frame, a frame-to-frame change rate value corresponding to a predicted compositional load the respective layer would place on a graphical processing unit (GPU); identify a layer having a frame-to-frame change rate value corresponding to placing the greatest predicted compositional load on the GPU; cause a hardware overlay circuit coupled to a display controller circuit to compose the layer identified as having the frame-to-frame change rate value corresponding to placing the greatest predicted compositional load on the GPU to provide a first frame overlay; cause the GPU to compose at least a portion of the remaining layers included in the plurality of layers to provide a second frame overlay; and cause the display controller circuitry to composite the first frame overlay and the second frame overlay to provide the display frame.

Example 20 may include elements of example 19 where the instructions may further cause the frame composition controller circuit to: determine whether the layer having the frame-to-frame change rate value corresponding to placing the greatest predicted compositional load on the GPU is also at least one of: a z-order uppermost layer in the plurality of layers; a z-order lowermost layer in the plurality of layers; or a non-overlapping, z-order intermediate layer in the plurality of layers that does not overlap any of the layers positioned above the respective layer in the z-order.

Example 21 may include elements of example 19 where the instructions that cause the frame composition controller circuit to determine a frame-to-frame change rate value corresponding to placing the greatest predicted compositional load on the GPU, may further cause the frame composition controller circuit to: determine a frame-to-frame change rate value corresponding to a predicted compositional load placed on the GPU based on the size of the respective layer.

Example 22 may include elements of example 21 where the instructions that cause the frame composition controller circuit to determine a frame-to-frame change rate value corresponding to placing the greatest predicted compositional load on the GPU, may further cause the frame composition controller circuit to: determine a frame-to-frame change rate value corresponding to a predicted compositional load placed on the GPU based on a percentage of display elements changing from frame-to-frame in the respective layer.

Example 23 may include elements of example 21 where the machine readable instructions that cause the frame composition controller circuit to determine a frame-to-frame change rate value corresponding to a predicted compositional load placed on the GPU based on a percentage of display elements changing from frame-to-frame may further cause the frame composition controller circuit to: determine a frame-to-frame change rate value corresponding to a predicted compositional load placed on the GPU based on a percentage of pixels changing from frame-to-frame in the respective layer.

Example 24 may include elements of example 21 where the instructions may further cause the frame composition controller circuit to: identify previously composed static layers in the remaining display frame members, each of the previously composed static layers characterized by: a frame-to-frame change rate value indicative of no changes frame-to-frame; and no change in z-order location frame-to-frame; cause the GPU to: avoid composing the identified previously composed static layers; and include the identified previously composed static layers in the second frame overlay.

According to example 25, there is provided an electronic device. The electronic device may include a frame composition controller circuit to: determine, for each layer included in a plurality of layers that form a display frame, a frame-to-frame change rate value corresponding to a predicted compositional load the respective layer would place on a graphical processing unit (GPU); identify a layer having a frame-to-frame change rate value corresponding to placing the greatest predicted compositional load on the GPU; cause a hardware overlay circuit coupled to a display controller circuit to compose the layer identified as having the frame-to-frame change rate value corresponding to placing the greatest predicted compositional load on the GPU to provide a first frame overlay; cause the GPU to compose at least a portion of the remaining layers included in the plurality of layers to provide a second frame overlay; and cause the display controller circuitry to composite the first frame overlay and the second frame overlay to provide the display frame.

Example 26 may include elements of example 25 and the display controller circuit may further determine whether the layer having the frame-to-frame change rate value corresponding to placing the greatest predicted compositional load on the GPU is also at least one of: a z-order uppermost layer in the plurality of layers; a z-order lowermost layer in the plurality of layers; or a non-overlapping, z-order intermediate layer in the plurality of layers that does not overlap any of the layers positioned above the respective layer in the z-order.

Example 27 may include elements of example 25 and the display controller circuit may further determine a frame-to-frame change rate value corresponding to a predicted compositional load placed on the GPU based on the size of the respective layer.

Example 28 may include elements of example 27 and the display controller circuit may further determine a frame-to-frame change rate value corresponding to a predicted compositional load placed on the GPU based on a percentage of display elements changing from frame-to-frame in the respective layer.

Example 29 may include elements of example 28 and the display controller circuit may further determine a frame-to-frame change rate value corresponding to a predicted compositional load placed on the GPU based on a percentage of pixels changing from frame-to-frame in the respective layer.

Example 30 may include elements of example 25 and the display controller circuit may further identify previously composed static layers in the remaining display frame members, each of the previously composed static layers characterized by: a frame-to-frame change rate value indicative of no changes frame-to-frame; and no change in z-order location frame-to-frame; and the display controller circuit may further cause the GPU to: avoid composing the identified previously composed static layers; and include the identified previously composed static layers in the second frame overlay.

According to example 31, there is provided a system to selectively compose layers in a display frame via hardware, the system being arranged to perform the method of any of examples 7 through 12.

According to example 32, there is provided a chipset arranged to perform the method of any of examples 7 through 12.

According to example 33, there is provided a non-transitory machine readable medium comprising a plurality of instructions that, in response to be being executed on a computing device, cause the computing device to carry out the method according to any of examples 7 through 12.

According to example 34, there is provided a device configured to selectively compose layers in a display frame via hardware, the device being arranged to perform the method of any of examples 7 through 12.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents.

What is claimed:

1. A system to selectively compose layers via system hardware, the system comprising:
    a graphical processing unit (GPU);
    a display controller circuit, including a hardware overlay circuit, communicably coupled to the GPU; and
    a frame composition controller circuit communicably coupled to the GPU and to the display controller circuit, the frame composition controller circuit to:
        for each layer included in a plurality of layers that form a display frame, determine a frame-to-frame change rate value using at least a portion of data included in a display frame buffer handle associated with the respective layer, the frame-to-frame change rate value corresponding to a predicted computational load the respective layer would place on the GPU;
        identify layer having a frame-to-frame change rate value corresponding to placing the greatest predicted computational load on the GPU;
        cause the hardware overlay circuit to compose the layer having the frame-to-frame change rate value indicative of placing the greatest predicted computational load on the GPU to provide at least one first frame overlay;
        cause the GPU to compose at least a portion of the remaining layers included in the plurality of layers to provide a second frame overlay; and
        cause the display controller to composite the first frame overlay and the second frame overlay to provide the display frame.

2. The system of claim 1, the display controller circuit to further:
    identify whether the layer the frame-to-frame change rate value corresponding to placing the greatest predicted computational load on the GPU is also at least one of:
        a z-order uppermost layer in the plurality of layers;
        a z-order lowermost layer in the plurality of display frame layers; or
        a non-overlapping, z-order intermediate layer in the plurality of display frame layers that does not overlap any of the layers positioned above layer in the z-order.

3. The system of claim 1, the display controller circuit to further:
    determine a frame-to-frame change rate value corresponding to a predicted computational load placed on the GPU based on the size of the respective layer.

4. The system of claim 3, the display controller circuit to further:
    determine a frame-to-frame change rate value corresponding to a predicted computational load placed on the GPU based on a percentage of display elements changing from frame-to-frame in the respective layer.

5. The system of claim 4, the display controller circuit to further:
    determine a frame-to-frame change rate value corresponding to a predicted computational load placed on the GPU based on a percentage of pixels changing from frame-to-frame in the respective layer.

6. The system of claim 1, the display controller circuit to further:
    identify previously composed static layers in the remaining display frame members, each of the previously composed static layers characterized by:
        a frame-to-frame change rate value indicative of no changes frame-to-frame; and
        no change in z-order location frame-to-frame; and
    cause the GPU to:
        avoid composing the identified previously composed static layers; and
        include the identified previously composed static layers in the second frame overlay.

7. A method of selectively composing layers via system hardware, the method comprising:
    for each layer included in a plurality of layers that form a display frame, determining, by a frame composition controller circuit, a frame-to-frame change rate value using at least a portion of data included in a display frame buffer handle associated with the respective layer, the frame-to-frame change rate value corresponding to a predicted computational load the respective layer would place on a graphical processing unit (GPU);

identifying a layer having a frame-to-frame change rate value corresponding to placing the greatest predicted computational load on the GPU;

causing a hardware overlay circuit coupled to a display controller circuit to compose the layer identified as having the frame-to-frame change rate value corresponding to placing the greatest predicted computational load on the GPU to provide a first frame overlay;

causing the GPU to compose at least a portion of the remaining layers included in the plurality of layers to provide a second frame overlay; and causing the display controller circuitry to composite the first frame overlay and the second frame overlay to provide the display frame.

8. The method of claim 7, further comprising determining whether the layer having the frame-to-frame change rate value corresponding to placing the greatest predicted computational load on the GPU is also at least one of:
a z-order uppermost layer in the plurality of layers;
a z-order lowermost layer in the plurality of layers; or
a non-overlapping, z-order intermediate layer in the plurality of layers that does not overlap any of the layers positioned above the respective layer in the z-order.

9. The method of claim 7 wherein determining a frame-to-frame change rate value corresponding to placing the greatest predicted computational load on the GPU comprises:
determining a frame-to-frame change rate value corresponding to a predicted computational load placed on the GPU based on the size of the respective layer.

10. The method of claim 9 wherein determining a frame-to-frame change rate value corresponding to placing the greatest predicted computational load on the GPU further comprises:
determining a frame-to-frame change rate value corresponding to a predicted computational load placed on the GPU based on a percentage of display elements changing from frame-to-frame in the respective layer.

11. The method of claim 10 wherein determining a frame-to-frame change rate value corresponding to a predicted computational load placed on the GPU based on a percentage of display elements changing from frame-to-frame comprises:
determining a frame-to-frame change rate value corresponding to a predicted computational load placed on the GPU based on a percentage of pixels changing from frame-to-frame in the respective layer.

12. The method of claim 9, further comprising:
identifying previously composed static layers in the remaining display frame members, each of the previously composed static layers characterized by:
a frame-to-frame change rate value indicative of no changes frame-to-frame; and
no change in z-order location frame-to-frame;
causing the GPU to:
avoid composing the identified previously composed static layers; and
include the identified previously composed static layers in the second frame overlay.

13. A system for selectively composing layers via system hardware, the method comprising:
a means for determining, for each layer included in a plurality of layers that form a display frame, a frame-to-frame change rate value using at least a portion of data included in a display frame buffer handle associated with the respective layer, the frame-to-frame change rate value corresponding to a predicted computational load the respective layer would place on a graphical processing unit (GPU);

a means for identifying a layer having a frame-to-frame change rate value corresponding to placing the greatest predicted computational load on the GPU;

a means for causing a hardware overlay circuit coupled to a display controller circuit to compose the layer identified as having the frame-to-frame change rate value corresponding to placing the greatest predicted computational load on the GPU to provide a first frame overlay;

a means for causing the GPU to compose at least a portion of the remaining layers included in the plurality of layers to provide a second frame overlay; and a means for causing the display controller circuitry to composite the first frame overlay and the second frame overlay to provide the display frame.

14. The system of claim 13, further comprising a means for determining whether the layer having the frame-to-frame change rate value corresponding to placing the greatest predicted computational load on the GPU is also at least one of:
a z-order uppermost layer in the plurality of layers;
a z-order lowermost layer in the plurality of layers; or
a non-overlapping, z-order intermediate layer in the plurality of layers that does not overlap any of the layers positioned above the respective layer in the z-order.

15. The system of claim 13 wherein the means for determining a frame-to-frame change rate value corresponding to placing the greatest predicted computational load on the GPU comprises:
a means for determining a frame-to-frame change rate value corresponding to a predicted computational load placed on the GPU based on the size of the respective layer.

16. The system of claim 15 wherein the means for determining a frame-to-frame change rate value corresponding to placing the greatest predicted computational load on the GPU further comprises:
a means for determining a frame-to-frame change rate value corresponding to a predicted computational load placed on the GPU based on a percentage of display elements changing from frame-to-frame in the respective layer.

17. The system of claim 16 wherein the means for determining a frame-to-frame change rate value corresponding to a predicted computational load placed on the GPU based on a percentage of display elements changing from frame-to-frame comprises:
a means for determining a frame-to-frame change rate value corresponding to a predicted computational load placed on the GPU based on a percentage of pixels changing from frame-to-frame in the respective layer.

18. The system of claim 14, further comprising:
a means for identifying previously composed static layers in the remaining display frame members, each of the previously composed static layers characterized by:
a frame-to-frame change rate value indicative of no changes frame-to-frame; and
no change in z-order location frame-to-frame;
a means for causing the GPU to:
avoid composing the identified previously composed static layers; and include the identified previously composed static layers in the second frame overlay.

19. A non-transitory computer readable medium that includes instructions that when executed by a circuit cause the circuit to provide a frame composition controller circuit, the frame composition controller circuit to:
   determine, for each layer included in a plurality of layers that form a display frame, a frame-to-frame change rate value using at least a portion of data included in a display frame buffer handle associated with the respective layer, the frame-to-frame change rate value corresponding to a predicted computational load the respective layer would place on a graphical processing unit (GPU);
   identify a layer having a frame-to-frame change rate value corresponding to placing the greatest predicted computational load on the GPU;
   cause a hardware overlay circuit coupled to a display controller circuit to compose the layer identified as having the frame-to-frame change rate value corresponding to placing the greatest predicted computational load on the GPU to provide a first frame overlay;
   cause the GPU to compose at least a portion of the remaining layers included in the plurality of layers to provide a second frame overlay; and
   cause the display controller circuitry to composite the first frame overlay and the second frame overlay to provide the display frame.

20. The computer readable medium of claim 19 wherein the instructions further cause the frame composition controller circuit to:
   determine whether the layer having the frame-to-frame change rate value corresponding to placing the greatest predicted computational load on the GPU is also at least one of:
      a z-order uppermost layer in the plurality of layers;
      a z-order lowermost layer in the plurality of layers; or
      a non-overlapping, z-order intermediate layer in the plurality of layers that does not overlap any of the layers positioned above the respective layer in the z-order.

21. The computer readable medium of claim 19 wherein the instructions that cause the frame composition controller circuit to determine a frame-to-frame change rate value corresponding to placing the greatest predicted computational load on the GPU, further cause the frame composition controller circuit to:
   determine a frame-to-frame change rate value corresponding to a predicted computational load placed on the GPU based on the size of the respective layer.

22. The computer readable medium of claim 21 wherein the instructions that cause the frame composition controller circuit to determine a frame-to-frame change rate value corresponding to placing the greatest predicted computational load on the GPU, further cause the frame composition controller circuit to:
   determine a frame-to-frame change rate value corresponding to a predicted computational load placed on the GPU based on a percentage of display elements changing from frame-to-frame in the respective layer.

23. The computer readable medium of claim 21 wherein the machine readable instructions that cause the frame composition controller circuit to determine a frame-to-frame change rate value corresponding to a predicted computational load placed on the GPU based on a percentage of display elements changing from frame-to-frame further cause the frame composition controller circuit to:
   determine a frame-to-frame change rate value corresponding to a predicted computational load placed on the GPU based on a percentage of pixels changing from frame-to-frame in the respective layer.

24. The computer readable medium of claim 21 wherein the instructions further cause the frame composition controller circuit to:
   identify previously composed static layers in the remaining display frame members, each of the previously composed static layers characterized by:
      a frame-to-frame change rate value indicative of no changes frame-to-frame; and
      no change in z-order location frame-to-frame;
   cause the GPU to:
      avoid composing the identified previously composed static layers; and
      include the identified previously composed static layers in the second frame overlay.

* * * * *